C. R. MESTON.
VALVE FOR REFRIGERATING SYSTEMS.
APPLICATION FILED FEB. 21, 1917.
1,302,948.
Patented May 6, 1919.
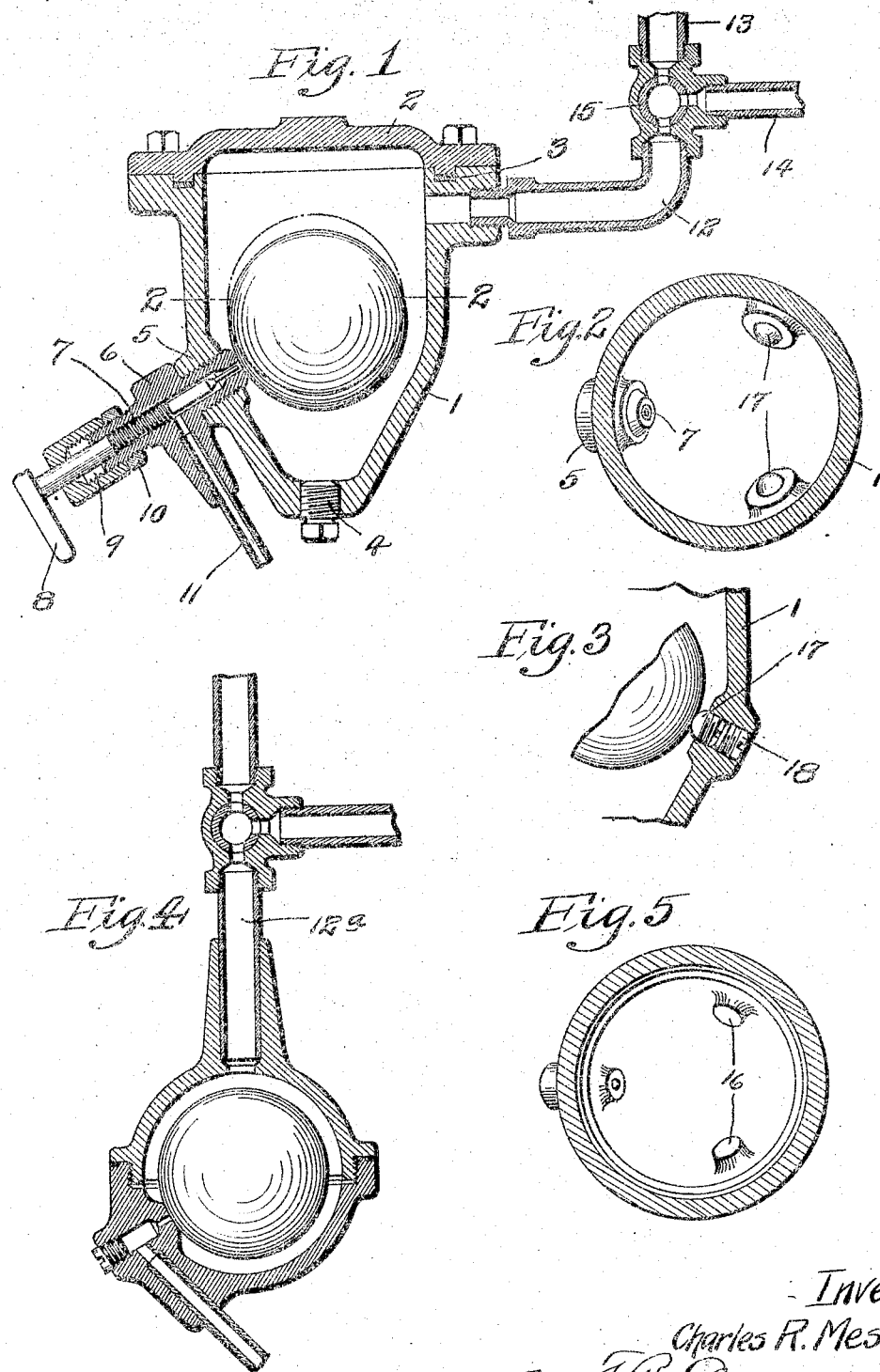
Inventor
Charles R. Meston

UNITED STATES PATENT OFFICE.

CHARLES R. MESTON, OF ST. LOUIS, MISSOURI.

VALVE FOR REFRIGERATING SYSTEMS.

1,302,948.  Specification of Letters Patent.  Patented May 6, 1919.

Application filed February 21, 1917. Serial No. 150,065.

*To all whom it may concern:*

Be it known that I, CHARLES R. MESTON, a citizen of the United States, residing at the city of St. Louis, State of Missouri, have invented a certain new and useful Improvement in Valves for Refrigerating Systems, of which the following is a full, clear, and exact description, such as will enable others skilled in the art to which it appertains to make and use the same, reference being had to the accompanying drawings, forming part of this specification, in which—

Figure 1 is a vertical sectional view through my improved valve.
Fig. 2 is a cross sectional view on line 2—2 of Fig. 1.

Fig. 3 is a detail view of a means of adjusting the valve.

Fig. 4 is a detail view of a modified form of valve.

Fig. 5 is a detail view similar to Fig. 2 showing a simplified construction.

This invention relates to a new and useful improvement in valves for refrigerating systems such for instance as that disclosed in an application filed by me of even date herewith wherein there is illustrated a condensing element and an expansion element, a compressor for drawing off the gaseous sulfur dioxid from the expansion element and forcing it into the condensing element or coil; there being also a by-pass leading from the low end or portion of the condensing element back to the low pressure side of the compressor whereby the non-refrigerant or oil in the system practically to the exclusion of the refrigerant (of greater specific gravity) is returned to the compressor and not passed through the expansion element. There is illustrated in said application a ball valve which is described as having a floating capacity (or flotation) practically equal to the specific gravity of water, that is, said valve would float at or near the surface of water; but as the specific gravity of sulfur dioxid used in the system is greater than water (1.50) and the non-refrigerant is lighter than water (.75 approximately), it follows that if the valve chamber is filled with the refrigerant, the valve will float or become unseated so as to permit the refrigerant to pass from the valve chamber into the expansion coils; whereas if the valve chamber is filled with the non-refrigerant (oil) it will not float but remain seated on the valve seat and prevent the oil or non-refrigerant from passing into the expansion element.

In designing a ball valve having the above characteristics, I have had in mind several conditions which tend to render the operation of such a valve practically automatic. One of these is the location of the valve seat with respect to the valve, at an angle to its vertical or flotation movement, whereby it is rendered sensitive and may become unseated by the sulfur dioxid when it reaches the proper level by a rolling action; another feature of my present invention is the absolute freedom of the ball which makes it sensitive in that it is not connected to moving parts; another, is the manner of locating the ball with respect to its seat whereby it will be substantially in position to close the seat when the liquid of lighter specific gravity (the non-refrigerant or oil) makes an effort to flow out; and finally, by having the ball free and imparting to it a rolling action as it leaves its seat by being floated when the refrigerant predominates in the valve chamber, the ball upon returning to its seat, when the non-refrigerant predominates in said chamber, will present a new surface to the valve seat and in this manner the spherical surface of the ball is not liable to become worn.

This rolling action is obtained by locating the exit opening in such position that the ball will coöperate with said opening at a point to one side of the vertical and below the horizontal axis of said ball, so that the sucking action of the exit opening upon the ball will oppose its flotation in a vertical direction. This sucking action is due to the difference of pressure in the valve chamber and the exit port and the pipe connected thereto, the valve chamber having a higher pressure than the exit port.

In the drawings, 1 indicates a valve casing which is preferably of the shape shown in Fig. 1 and covered by a cap 2 having a circumferential rib bearing upon the gasket 3. 4 is a tap plug in the bottom of the casing which may be used for draining the system; 5 is a threaded boss into which is screwed a valve plug 6 in which is located an adjusting pin and needle stem 7 threaded in the plug 6, provided with a handle 8 for manual adjustment in a manner which is well known. This combined needle valve and adjusting pin is made fluid-tight by a universal nut 9 coöperating with a jam nut 10. 11 is the pipe connected to and leading from the exit port of the valve. 12 is the inlet port which is in the form of a pipe connecting the valve chamber with the vertical pipe 13 draining the refrigerant or the non-refrigerant as the case may be, and which pipe 13, as indicated in my companion application, leading from the low portion of the condensing element, has a by-pass pipe 14 connecting the pipe 13 with the low pressure side of the compressor; while 15 is a three-way valve or cock having a handle for manual manipulation whereby the operator may at any time cut out the by-pass pipe thereby returning the refrigerant and the non-refrigerant to the compressor through the expansion element, or drain the system, as the case may be, or cause the refrigerant and the non-refrigerant to be again returned to the compressor, as in starting the system.

In the position shown in Fig. 1, the three-way valve is in a position for normal operation wherein automatic regulation, not a part of this application, may be used.

As stated before, the valve seat is located at an angle to the ball valve and when it is lifted by flotation, it will be raised from its seat by rolling action, as indicated by dotted lines in Fig. 1, but in order to determine the seated position of the valve, I may arrange lugs 16 to opposing points approximately at 120 degrees removed from the valve seat, whereby when the ball is in its low position, it will be properly seated. These lugs are machine finished and obviate the necessity of finishing the extended surfaces.

In Figs. 2 and 3 I have shown an adjusting plug 17 having a pack screw 18 whereby the operator can adjust each individual ball in the casing.

In Fig. 4 I have shown a different form of valve casing in which the inlet pipe 12ª enters from the top instead of the side and in which the casing is practically spherical in form and divided substantially in the middle, the two parts being screwed together with a rubber gasket between to make a tight joint.

What I claim is:

1. A valve of the character described comprising a casing, a valve seat having a duct or passage located above the lowermost portion of the valve and below the horizontal axis thereof, a free floating valve which is designed to be operated by fluids of different specific gravities to entirely close or open the duct through said seat, and spaced supporting members within the housing, which members coöperate with the valve seat to determine the seated position of the valve.

2. In a valve of the character described, a valve casing having a valve seat arranged at an angle to the vertical axis of the casing and an exit opening located in said valve seat, a spherical valve which is designed to be operated by fluids of different specific gravities to entirely close or open said exit opening and a pair of adjustable spaced supporting members within the casing for determining the seated position of the valve.

3. In a valve of the character described, a valve casing having a valve seat arranged at an angle to the vertical axis of the casing and an exit opening located in said valve seat, a spherical valve which is designed to be operated by fluids of different specific gravities to entirely close or open said exit opening, said valve when being operated from said seat having a rolling action relative thereto whereby it is rendered sensitive to its flotativeness, and spaced supporting members within the housing, which members coöperate with the valve seat to determine the seated position of the valve.

4. A valve for refrigerating systems comprising a casing, a floating valve arranged therein in the form of a sphere, a valve seat with which said spherical floating valve coöperates located to one side of the vertical axis of the valve casing, and two or more supporting parts arranged on opposite sides of the valve casing for determining the seated position of the valve.

5. A valve for refrigerating systems comprising a casing, a floating valve arranged therein in the form of a sphere, a valve seat with which said spherical floating valve coöperates located to one side of the vertical axis of the valve casing, and two or more supporting parts arranged on opposite sides of the valve casing for determining the seated position of the valve, said supporting parts being adjustable.

6. In a valve for refrigerating systems, the combination of a casing having an inlet port connected to a portion thereof through which liquids of different specific gravities may enter, a valve having a flotation point between the different specific gravities of the liquids entering said casing, whereby said valve will be floated to uncover the exit opening from said casing when one of said liquids predominates in said casing, or said valve will be depressed to entirely close the exit opening when the other of said liquids predominates in said casing, said valve casing having an exit opening located above the lowermost portion of the valve, and below the horizontal axis thereof, a pipe leading from said exit opening and adjustable means within the casing for determining the seated position of the valve.

In testimony whereof I hereunto affix my signature this 19th day of February, 1917.

CHARLES R. MESTON.

Copies of this patent may be obtained for five cents each, by addressing the "Commissioner of Patents, Washington, D. C."